Figure 1:
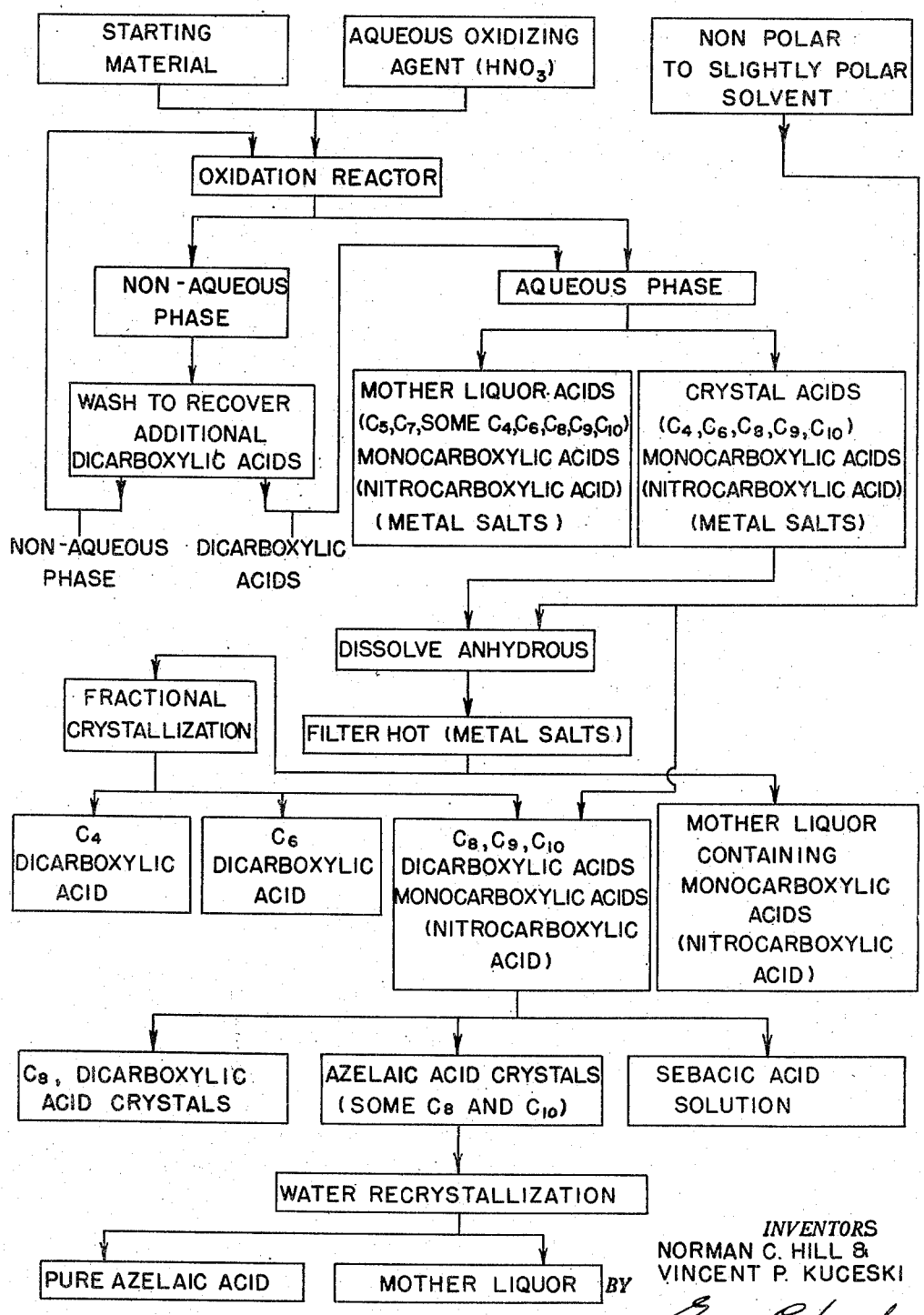

United States Patent Office 2,824,134
Patented Feb. 18, 1958

2,824,134

SEPARATION OF AZELAIC ACID FROM MIXTURES CONTAINING SUBERIC AND AZELAIC ACIDS, ETC.

Norman C. Hill, Akron, Ohio, and Vincent P. Kuceski, Park Forest, Ill., assignors to The C. P. Hall Company, Akron, Ohio, a corporation of Ohio Application May 24, 1955, Serial No. 510,723

9 Claims. (Cl. 260—537)

This invention relates to the preparation of azelaic acid and its separation from a crystalline mixture of dicarboxylic acids containing largely suberic acid ($C_8$) and azelaic acid ($C_9$). Other dicarboxylic acids such as lower dicarboxylic acids, including succinic acid ($C_4$) and adipic acid ($C_6$) may be present, but such acids will normally be present in only minor amounts. Glutaric acid ($C_5$) and pimelic acid ($C_7$) may also be present, but the suberic and azelaic acids are preferably separated therefrom prior to the purification described herein as by crystallization from a polar solvent, as described in copending application of Hill S. N. 510,605, filed May 24, 1955. Sebacic acid and acids of greater chain length may likewise be present.

Crystalline mixtures of suberic acid and azelaic acid are obtainable by crystallization of a mixture of dicarboxylic acids with an organic solvent which is relatively non-polar to slightly polar; the percentage of suberic acid in the dicarboxylic acid mixture which is so crystallized may be substantially larger than the percentage of azelaic acid present.

The dicarboxylic acid mixtures to which this invention relates are obtainable in various ways, as by the oxidation of saturated and unsaturated straight-chain or non-branched hydrocarbons and oxygen-containing derivatives thereof in which at least 9 carbon atoms are contained in a straight saturated chain, and preferably more, such as 12 or 14, up to 18 or 20 or more. Such starting materials include fatty acids such as stearic acid, oleic acid and palmitic acid, etc., and other fatty acids derived from animal sources such as tallow fats and fish oils, etc., and vegetable sources such as the seed oils including cottonseed oil and soyabean oil, corn oil, coconut oil, and foots of various materials, as well as tall oil, low in rosin acids; red oil and other fatty acids of commerce may also be employed. Other starting materials include petroleum materials such as unbranched hydrocarbons and unbranched oxygen-containing derivatives thereof. Starting materials include also monocarboxylic acids and other by-products of oxidation processes in which only a part of such starting materials have been oxidized to dicarboxylic acids, using any of the various oxidizing agents.

Various oxidizing agents may be employed depending upon the starting materials used. Thus, permanganates, chromic acid, ozone, air, oxygen, nitrous acid, and oxides of nitrogen greater than $N_2O$ are known as oxidizing agents for the oxidation of unsaturated fatty acids such as oleic acid, etc., to dicarboxylic acids and monocarboxylic acids. The same is true for the unsaturated hydrocarbons, except that when air is used as the oxidizing agent a high temperature and catalyst must be employed. On the other hand, if the starting material is a saturated fatty acid or a saturated hydrocarbon, nitric acid is the only oxidizing agent which it is feasible to use under known oxidizing conditions. The predominant reaction with other oxidizing agents appears to be the formation of hydroxy compounds and peroxides without scission. Various catalysts have been employed, and this invention contemplates their use.

Ordinarily such reactions involve the use of an aqueous oxidizing medium which is immiscible with the starting material. Ozonization may be carried out in the presence or absence of water, but then the oxidation product will be treated with water, with or without catalysts, at elevated temperatures to decompose the ozonide formed by such treatment. Regardless of whether or not all of the starting material is converted to the final product and an intermediate or by-product is formed, the resulting reaction mixture comprises two layers, an aqueous layer and a non-aqueous layer. The carboxylic acids formed are distributed between these layers, according to the distribution law which includes intrinsic solubilities, mutual solubilities, polarities, association, hydrogen bonding, solvent employed, and the like. After separation of the aqueous layer the non-aqueous layer may be washed with water or other suitable immiscible solvents to recover the dicarboxylic acid content thereof.

The water solution of the dicarboxylic acids which constitutes the aqueous layer or phase, usually containing also monocarboxylic acids, is subjected to various treatments for the separation and recovery of the various acid products, including said monocarboxylic acids.

The invention will be more particularly described in connection with the oxidation of red oil by nitric acid. Air may be used with the nitric acid. In the oxidation, nitric acid of about 25 percent concentration will be maintained in contact with the fatty acids. Different temperatures and concentrations of acid may be employed, and the operation may be carried out at superatmospheric pressure or at atmospheric pressure.

Beside producing dicarboxylic acids including suberic ($C_8$) and azelaic acid ($C_9$), the nitric acid oxidation process also produces the complete homologous series of monocarboxylic acids ($C_4$ to $C_9$) from oleic acid, and higher homologues if lauric, myristic, palmitic, stearic or other members of the higher saturated fatty acids are employed as starting materials.

If nitric acid is used in the oxidation, the dicarboxylic acids produced may also be contaminated with nitrocarboxylic acid. (The term "nitrocarboxylic acid" will be used herein to refer to one or more nitromonocarboxylic acids or nitrodicarboxylic acids.)

Both the monocarboxylic acids and the nitrocarboxylic acid are objectionable in the dicarboxylic acid product for various reasons. For example, in polymerization processes, as in the manufacture of polyurethane polymers, nylons and the like these impurities act as chain-stoppers and prevent the production of uniform high-molecular-weight polymers.

The oxidation product is first separated into (1) an aqueous solution of the more soluble acids (called aqueous phase in the drawings) together with any remaining nitric acid, etc., and (2) an immiscible mixture of carboxylic acids, etc. (called Non-aqueous phase on the flow sheets). The latter may be washed with water or aqueous salt solutions, and the recovered dicarboxylic acids added to the aqueous phase as indicated on the flow sheets, although this is optional.

Some of the dissolved acids are then crystallized from the aqueous phase. It is usually necessary to concentrate to about 50 to 60 percent solids to separate the desired acids, namely, the $C_8$ and $C_9$ and higher dicarboxylic acids together with some of the $C_4$ and $C_6$ dicarboxylic acids. These are known as crystal acids to distinguish them from what are known as mother liquor acids which latter comprise substantially all of the $C_5$ and $C_7$ dicarboxylic acids and some of the $C_4$ and $C_6$ dicarboxylic acids.

A large part of the water-soluble monocarboxylic acids is removed from the crystal acids by one or more crystallizations from water, nitric acid (nitric acid of any concentration, but 15 to 25 percent solutions are preferred), or other polar solvents. The nitrocarboxylic acid formed when any nitric acid is used in the oxidation is largely removed from the crystal acids by said recrystallizations and these impurities are, therefore, found to a greater extent in the mother liquor acids ($C_5$ and $C_7$, etc.), all of which is covered in a copending application of Hill Serial No. 510,605 filed May 24, 1955. The methods of partial and complete removal of the monocarboxylic acids and nitrocarboxylic acid from dicarboxylic acids by recrystallization of the crystal acids using a non-polar or slightly polar solvent such as ortho dichlorobenzene, 1,2,3-trichloropropane, etc., or by countercurrent extraction of a water solution of crystal acids using such a solvent is covered by copending application of Hill and Higuchi Serial No. 510,768 filed May 24, 1955.

The $C_8$, $C_9$ and higher dicarboxylic acids were separated as a crystal fraction, and then by recrystallization the $C_8$ dicarboxylic acid (suberic acid) is separated. The $C_9$ dicarboxylic acid (azelaic acid) is then separated and, if desired, it may be purified as described in greater detail in what follows. Alternatively, if the conditions are satisfactory, as where the amount of dicarboxylic acids of greater chain length than $C_8$ is relatively small, or where the amount of solvent is reduced after the removal of the $C_4$ and $C_6$ dicarboxylic acids from the crystal acids so that crystallization may be effected at an elevated temperature, the $C_8$ dicarboxylic acid may be crystallized directly from a solution of the crystal acids (more or less purified) in a non-polar to slightly polar solvent, and the $C_9$ dicarboxylic acid (azelaic acid) may then be crystallized from the solution. This azelaic acid may be purified as described.

As typical of such an oxidation product we refer to Table 1 below which shows the composition of the total dicarboxylic acids recovered from the oxidation of red oil with nitric acid and air, as determined by chromatographic analysis.

TABLE 1

Acid:
- Succinic ($C_4$) _____ 10.12
- Glutaric ($C_5$) _____ 10.74
- Adipic ($C_6$) _____ 13.91
- Pimelic ($C_7$) _____ 18.68
- Suberic ($C_8$) _____ 26.70
- Azelaic ($C_9$) _____ 18.46
- Sebacic ($C_{10}$) _____ 1.42

100.03

The foregoing percentages are computed on a monocarboxylic-acid-free and metal-free basis.

The various carboxylic acids, including the monocarboxylic and dicarboxylic acids, will be distributed between the aqueous phase of the reaction mixture and any non-aqueous phase present.

Ordinarily the two phases will be separated and the water phase will be separately treated from the recovery of the dicarboxylic acids, including the azelaic acid. A considerable portion of the dicarboxylic acids in the non-aqueous phase may be recovered by batch or countercurrent extraction using nitric acid of any concentration, but preferably 10 to 25 percent, and said dicarboxylic acids may then be added to the aqueous phase as indicated in the accompanying drawings. The lower-molecular-weight monocarboxylic acids present in the aqueous phase may be separated by steam distillation or solvent extraction.

Generally, metal salts are present. If an oxidizing agent such as chromic acid or permanganate is employed, such metal salts will be considerable and will be separated from the reaction product. Ozonization, nitric acid, etc., produce no metal salts except those formed by the corrosion of the equipment during the treatment, and the starting materials may be treated for separation of the metal ion as by washing the starting material with a non-miscible aqueous solution of a mineral acid such as nitric acid, as described in Hill and Kuceski application S. N. 450,823 filed August 18, 1954.

Metal salts formed during the treatment may be separated in ion-exchange equipment with resins or by the method described in copending application of Hill S. N. 510,667 filed May 24, 1955, in which the dicarboxylic acids are dissolved in a non-polar to slightly polar solvent, such as ortho dichlorobenzene, in the presence of sufficient sulfuric, phosphoric or other mineral acid to combine with the metal ions present, the solution made anhydrous by boiling off the water, and then the metal salts are removed by filtration. Alternatively, metal ions may also be removed as a final purification step, if desired, by the ion-exchange process as described in Hill and Higuchi S. N. 450,822 filed May 24, 1955. Other means for the removal of the metal salts may be employed.

Assuming that the monocarboxylic acids have been separated (and also any nitrocarboxylic acid which has been formed) and that the aqueous solution of the dicarboxylic acid product is substantially free from metal ions, the recovery of the various dicarboxylic acids resolves itself into a problem of separation.

Figure 2:
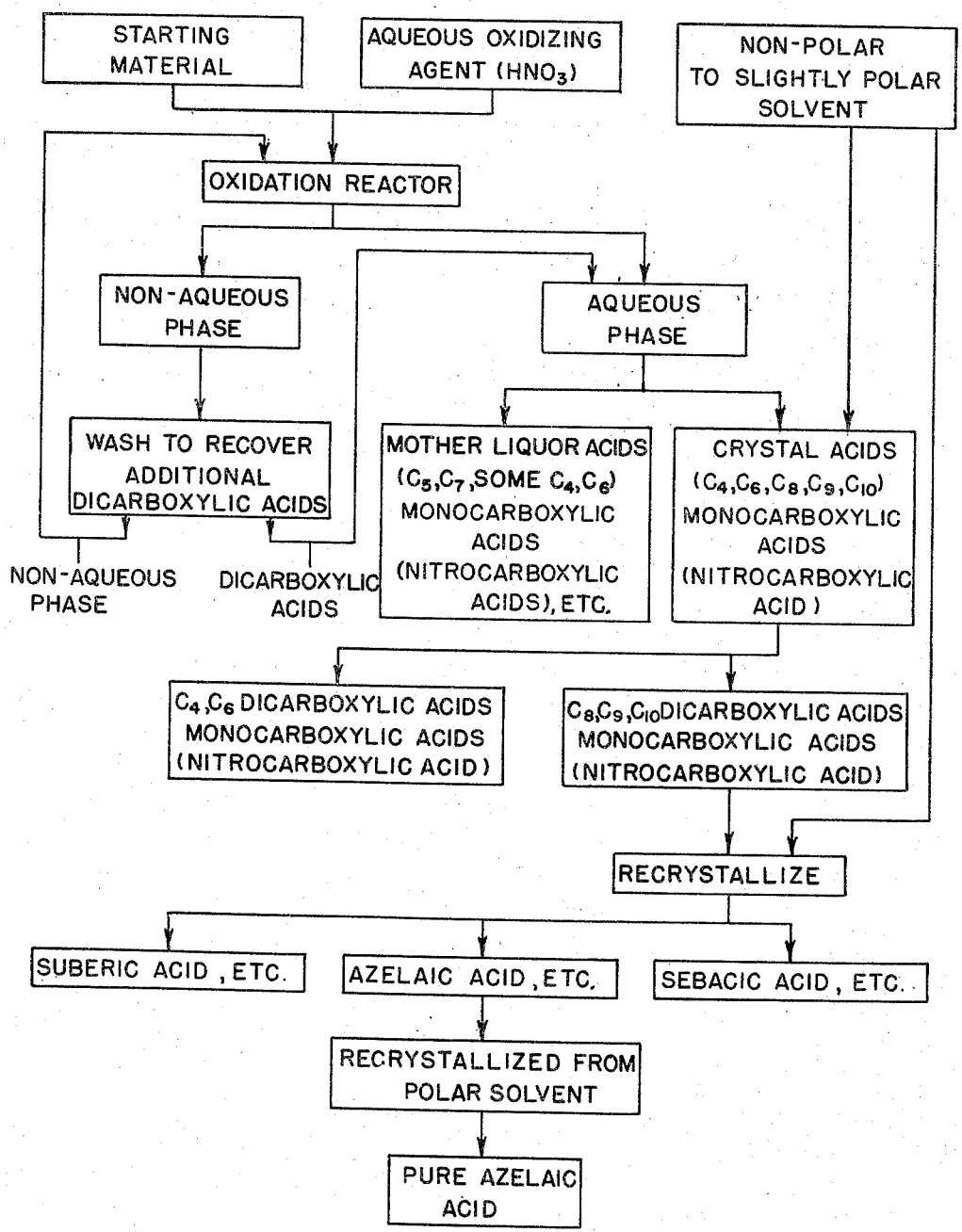

The dicarboxylic acids produced in the oxidation reaction may be sub-divided into mother liquor acids and crystal acids as shown on Figure 1 and Figure 2. In the process described by Figure 2, the separation of the crystal acids into their respective fractions, first separating the $C_4$ and $C_6$ dicarboxylic acids, etc., and then the $C_8$, $C_9$, and $C_{10}$ dicarboxylic acids, etc., is accomplished by the use of a non-polar to slightly polar solvent such as ortho dichlorobenzene, 1,2,3-trichloropropane, etc., and the monocarboxylic acids and nitrocarboxylic acid (produced when nitric acid is used in the oxidation) remaining are removed from the $C_8$, $C_9$, and $C_{10}$ dicarboxylic acid fraction by further recrystallization with the indicated solvent. The dichlorobenzene, when a mixture of $C_4$, $C_6$, $C_8$, $C_9$, and $C_{10}$ dicarboxylic acids is dissolved therein, precipitates or crystallizes out first the succinic acid ($C_4$), since this material is quite polar and the solvent itself is nearly non-polar. Next the $C_6$ dicarboxylic acid (contaminated with some $C_4$ and some $C_8$, $C_9$, and $C_{10}$ dicarboxylic acids) is crystallized by lowering the temperature or increasing the concentration of the dicarboxylic acids by removing dichlorobenzene by evaporation or distillation. The fractions have some contamination, as previously stated, by monocarboxylic and nitrocarboxylic acids which are purified by later recrystallizations or countercurrent extraction with a non-polar to slightly polar solvent as described in copending Hill and Higuchi application Serial No. 510,768 filed May 24, 1955.

If, instead of dichlorobenzene or other non-polar to slightly polar solvent, water is used as the solvent, the less polar dicarboxylic acids such as $C_{10}$, $C_9$, and $C_8$ crystallize out first (instead of last, as with non-polar or semipolar solvent). The more polar dicarboxylic acids then crystallize out such as $C_6$ and later $C_4$.

It is preferable to remove the $C_5$ and $C_7$ dicarboxylic acids prior to the separation procedures because of the extreme solubility of glutaric acid ($C_5$) and pimelic acid ($C_7$) (the latter is more soluble in the presence of $C_5$), both in polar and non-polar to slightly polar solvents, and is best removed and treated as the mother liquor acid previously described. Thus, it is possible to separate the less polar dicarboxylic acids first, and the more polar acid ($C_4$) last, using water or other polar solvents, just as separation is possible in the reverse order, using non-polar solvents.

*Example I*

SEPARATION OF SUBERIC ACID AND OTHER DICARBOXYLIC ACIDS USING A POLAR TO SLIGHTLY POLAR SOLVENT

The separation may be started with crystal acids obtained by the oxidation of a naturally occurring fatty acid such as is shown on Figure 1, after separation of $C_4$ and $C_6$ dicarboxylic acids (together or as separate fractions) from said crystal acids. The analysis of such acids after such a separation, for example, may be as shown below:

| | Percent by weight |
|---|---|
| Suberic acid | 57.02 |
| Azelaic acid | 39.8 |
| Sebacic acid | 3.0 |
| Total | 99.82 |

This acid mixture is dissolved in ortho dichlorobenzene or other slightly polar solvent, and upon cooling the suberic acid crystallizes out in substantially pure condition, since $C_9$ and $C_{10}$ dicarboxylic acids and the monocarboxylic acids are more soluble in such solvents than suberic acid. Such cooling is continued to effect the removal of all or substantially all of the azelaic acid as a separate fraction. By recrystallizing the azelaic acid from water, any low-molecular-weight dicarboxylic acid such as $C_4$ and $C_6$ or traces of $C_5$ and $C_7$ as well as $C_8$ which are separated with the azelaic acid may be removed.

The separation of suberic and azelaic acids by crystallization from solutions thereof in admixture does not follow the solubility data of the pure acids because of the mutual solubility of these two acids in one another. The solubilities of the pure acids at different temperatures are given in the following table, in grams of acid per 100 grams of water:

TABLE 2

*Solubilities of suberic and azelaic acids*

| Temperature | Grams Per Hundred Grams Water | | Ratio of Solubility $C_9/C_8$ |
|---|---|---|---|
| | Solubility of $C_8$ | Solubility of $C_9$ | |
| 40 | 0.58 | 0.60 | 1.03 |
| 45 | 0.75 | 0.80 | 1.07 |
| 50 | 0.98 | 1.09 | 1.10 |
| 55 | 1.29 | 1.55 | 1.20 |
| 60 | 1.68 | 2.20 | 1.31 |
| 65 | 2.20 | 3.35 | 1.52 |
| 70 | 2.95 | 5.25 | 1.78 |
| 75 | 4.15 | 8.5 | 2.05 |
| 80 | 5.65 | 15.1 | 2.67 |
| 85 | 8.0 | 29.9 | 3.73 |
| 90 | 11.2 | 59.0 | 5.27 |
| 95 | 16.3 | 140.0 | 8.59 |
| 100 | 24.1 | 435.0 | 18.05 |
| 105 | 37.5 | 4,500.0 | 120.0 |
| 110 | 58.0 | Infinite | Infinite |

The azelaic and sebacic acids are conveniently separated from a mixture of the two by dissolving the mixture in a solvent which is non-polar to slightly polar, such as dichlorobenzene, trichloropropane, etc. On cooling such a solution of these acids the suberic acid crystallizes out in a substantially pure condition because of the high solubility of the monocarboxylic acids, the azelaic acid, and the sebacic acid. If the crystallization is repeated to effect the removal of all or substantially all of the azelaic and sebacic acids, the remaining crystals are almost pure suberic acid or can be made to be 99.5±% pure by a final recrystallization from water to remove the last small quantities of the lower molecular weight dicarboxylic acids from the almost pure suberic acid, giving a practically pure suberic acid.

The resulting mother liquor adapts itself quite readily to treatment by the process herein contemplated which relates to the recovery of azelaic acid in a substantially pure condition. The mixture of dicarboxylic acids to be treated by the process herein contemplated for the recovery of substantially pure azelaic acid contains a major portion of azelaic acid, and preferably 60 percent or more, but usually acids containing as much as 70 percent azelaic acid will be employed to produce substantially pure azelaic acid. There may be up to 5 to 10 percent of lower dicarboxylic acids (up to $C_7$) present, but usually not more than 2 to 5 percent of these acids are present. The percentage of lower molecular weight dicarboxylic acids such as succinic acid and adipic acid present in the mother liquor controls the separation of suberic and azelaic acids only to a slight degree. Glutaric and pimelic acids are very water soluble and are retained in the aqueous phase and the acids crystallized therefrom are substantially free from glutaric and pimelic acids.

Thus, starting with a mixture of suberic, azelaic, and sebacic acids of the approximate analysis aforesaid and containing several percent of succinic and adipic acids, a solution thereof was produced in hot dichlorobenzene. This was cooled to separate a substantial amount of suberic acid of approximately 90 percent purity, which upon recrystallization from water gave suberic acid of 98.0 percent purity.

The mother liquor solution of dicarboxylic acids in dichlorobenzene, on further cooling gave crystalline acids which had the following dicarboxylic acid analysis, as shown in Table 3.

TABLE 3

| | Percent |
|---|---|
| Succinic acid | 1.5 |
| Adipic acid | 4.9 |
| Suberic acid | 20.22 |
| Azelaic acid | 71.5 |
| Sebacic acid | 0.6 |

Because of the high solubility of azelaic acid and the relatively low solubility of suberic acid at the higher temperatures, e. g., 80° C. or higher, it is customarily thought that crystallization of such a dicarboxylic acid mixture should be made at 80° C. or higher so as to retain the azelaic acid in solution and crystallize out the suberic acid. It was also thought that a temperature of at least 85° C. would be needed to dissolve 100 parts of the mixture shown in Table 3. Then on cooling such a mixture suberic acid would be precipitated on cooling to about 80° C. According to the ratio of solubilities we would not cool below about 80° C. because azelaic would start precipitating also.

It was with great satisfaction therefore that we discovered that we could easily dissolve 100 parts of the dicarboxylic acid mixture in 200 parts of water at 69° C. when solubility data would ordinarily lead us to believe that the temperature would allow only about 14 parts of such a mixture to dissolve.

Upon cooling this mixture very slowly we found that no crystals started precipitating until a temperature of 61.7° C. was reached. At this temperature the solubilities of the pure acids would ordinarily allow only about 4 parts to dissolve in 200 parts of water. Also at this temperature both suberic and azelaic acid should precipitate from this mixture to give a product which would be of little improvement over the starting mixture.

By the process of this invention, therefore, we have discovered that pure azelaic acid may be crystallized from water under conditions that from their solubility properties should yield only mixtures containing a high proportion of suberic acid.

*Example IA*

As an example, 100 parts of the above crystalline acids as shown in Table 3 were dissolved in 200 parts of water at 69° C. The mixture was cooled at about 1° per minute until a temperature of 61.7° C. was reached. At this temperature crystallization began. The cooling rate was decreased until the rate of cooling was about 1° every five minutes. When a temperature of 59.5° C. was reached, the mixture was filtered. This gave a crystal which weighed 100 parts (wet weight) and had an equivalent weight of 93.4. Upon drying its weight was 57- parts. This was redissolved in 114 parts of water at 70° C. and cooled until a temperature of 66.5° was reached. It was then cooled very slowly to 60° C. when it was filtered. This gave a crystal (wet weight) of 58.5 parts (dry weight 45.8 parts). Its equivalent weight was 94.1. This crystal was then dissolved in 91.6 parts of water at 90° C. It was cooled to 70° C. when crystallization began. The cooling was continued until a temperature of 57° C. was reached and the mixture was filtered, producing a material with an equivalent weight of 94.1. The dry crystal weighed 37 parts and had the following analysis:

TABLE 4

| | Percent |
|---|---|
| Succinic acid | 0.0 |
| Adipic acid | 0.0 |
| Suberic acid | 0.37 |
| Azelaic acid | 99.40 |

The combined filtrate weighted 61.24 parts (dry weight) and had the following analysis:

TABLE 5

| | Percent |
|---|---|
| Succinic acid | 2.46 |
| Adipic acid | 8.14 |
| Suberic acid | 32.8 |
| Azelaic acid | 56.7 |
| Sebacic acid | 1.0 |

*Example II*

As another example, 20 pounds of a mixture which contains 70 percent azelaic, 25 percent suberic acid and less than 5 percent total of succinic, adipic, and sebacic acids were dissolved in 40 pounds of water at 70° C. in a small jacketed kettle which had been provided with a means for gentle agitation. The solution was then cooled rapidly to 63° C. by means of cooling water through the jacket of the kettle. The forced cooling was stopped and the material was allowed to cool spontaneously but with agitation at the rate of 4° per hour. Crystals began forming at 61°, and the crystallization was then allowed to take place as long as the heat of crystallization maintained at temperature of 61° C. or better. After about one hour, agitation was stopped and the crystals were filtered free of solution. The average equivalent weight of the dry crystalline acids was 93.5 which corresponds to an azelaic acid of about 93 percent purity.

Water was then added to give a calculated solids content of 35 percent and the mixture heated by passing steam through the jacket of the kettle. The solids were all dissolved at 75° and cooling with agitation was again employed as previously described. This time crystallization started at 67° C. and the cooling was continued until a temperature of 63° C. was reached. This took about two hours. At the end of this time, the crystals were separated and pressed free from the mother liquor and just enough water was added to give a slurry. The slurry was then filtered and dried. An equivalent weight of a sample of the well dried acid was taken and found to be 93.8. This corresponds to a purity of 98 percent azelaic acid with a yield of 67 percent of the total azelaic acid available.

In order to obtain acid of an even higher purity than this, the acid was dissolved so as to obtain complete solution at about 85° C. The solution was cooled rapidly to a temperature of 73° C. and cooled slowly (4° per hour) to a temperature of 71° C. where crystallization began. Crystallization was continued over a period of about 2 hours until the temperature of 62° was reached. The solution was then filtered and the crystals slurried as before. The resulting dried crystals weighed 5.0 pounds and had an equivalent weight of 94.0. Analysis showed the following:

| | Percent |
|---|---|
| Succinic | 0.0 |
| Glutaric | 0.0 |
| Adipic | 0.0 |
| Pimelic | 0.0 |
| Suberic | 0.0 |
| Azelaic | 99.06 |
| Sebacic | 0.0 |
| Mono as pelargonic | 0.57 |
| | 99.63 |

It should again be noted that the solubility of the adjacent homologues, $C_8$ and $C_9$, in mixture, is much greater than indicated in the table of solubilities, Table 2, of suberic and azelaic acids when considered separately using water as the solvent. For example, at 66.5° C., 100 grams of dicarboxylic acids composed almost completely of suberic and azelaic acids (the mother liquor of the foregoing crystallization) remained soluble in 200 grams of water. In the table of solubilities of the pure and separate substances only 2.425 grams of suberic acid and 3.92 grams of azelaic acid are soluble per 100 grams of water, respectively, at this temperature. Calculating back to our analysis of the starting material, 45.86 grams of the mixture of suberic and azelaic acids are soluble in 100 grams of water. Thus, the mixture has a much greater solubility than one would expect from the solubility of the pure substances. The ratio of these solubilities is $$\frac{(45.86)(2)}{(2.425+3.92)}=14.4$$

The non-polar to slightly polar solvents which can be used include:

(a) Chlorinated aromatic compounds such as monochlorobenzene, ortho-dichlorobenzene or meta-dichlorobenzene, etc.

(b) Chlorinated aliphatic compounds such as 1,2,3-trichloropropane and other chlorinated aliphatic hydrocarbons.

(c) Ethers, preferably dibutyl ether and higher; dichloroisopropyl ether and the like have proved satisfactory.

(d) Hydrocarbons (aliphatic including normal and branched chain), such as nonane, decane up to dodecane or higher (see remarks on boiling points).

(e) Aromatic hydrocarbons may be used but they are generally not as satisfactory as the aliphatic hydrocarbons or the halogenated hydrocarbons (see remarks on boiling points).

(f) Alcohols may be used except for the tendency to esterify. Tertiary amyl alcohol is almost free of this tendency and is satisfactory except for cost.

The boiling point of the solvent is important in that if its boiling point is not high enough at atmospheric pressure the batch must be held under pressure so that temperatures of 135 to 140° C. may be reached, if necessary to throw the batch into solution. Such low boilers as benzene, toluene, ethyl and propyl ether while useful are dangerous, because of the possibility of leaks and subsequent vaporization, static or other sparks causing ignition. It is therefore preferred, though not absolutely necessary, to use solvents having boiling points of 150 to 220° C. Too high boiling points cause difficulty in removing the last traces of the solvent from the dicarboxylic acids, hence many solvents will work satisfactorily except for removing them readily at the end of the purification.

Although the foregoing examples refer more particularly to the treatment of a mixture of suberic and azelaic acids obtained by the oxidation of red oil with subsequent treatment in the manner indicated, the invention is not limited thereto, but relates to the separation of such acids in any ratio in which it is feasible to apply the process herein set forth.

What we claim is:

1. In the process of producing azelaic acid from aqueous reaction product obtained from the oxidation of source material of the class consisting of saturated and unsaturated acylic hydrocarbons and oxygen-containing derivatives thereof which hydrocarbons and derivatives contain at least 10 carbon atoms in a straight saturated chain, which aqueous product contains inorganic impurities, smaller amounts of succinic, glutaric, adipic, and pimelic acids, and larger amounts of suberic, azelaic, and sebacic acids, together with some monocarboxylic acids, the steps of cooling this aqueous phase to yield a crystalline product containing primarily suberic, azelaic, and sebacic acids, together with smaller amounts of succinic and adipic acids, dissolving this crystalline product in a non-polar to slightly polar solvent to crystallize out succinic and adipic acids at a relatively high temperature and cooling down to a relatively low temperature and separating suberic, azelaic, and sebacic acids as a separate fraction while retaining some monocarboxylic acids in solution, dissolving said separate fraction in a non-polar to slightly polar solvent, cooling the resulting solution to separate a substantial amount of the suberic acid while retaining some suberic acid and a substantial amount of azelaic acid in solution, and then on further cooling separating the azelaic acid in a separate fraction without separating more than a minor amount of suberic acid, while retaining most of the sebacic acid in solution, and then crystallizing said azelaic acid fraction from water.

2. In the method of producing azelaic acid from the aqueous reaction product obtained by the oxidation of an animal or vegetable fatty acid containing at least ten carbon atoms with aqueous nitric acid, which aqueous oxidation product contains inorganic impurities, smaller amounts of succinic, glutaric, adipic and pimelic acids and larger amounts of suberic, azelaic and sebacic acids, together with some monocarboxylic acids, the steps of cooling this aqueous product to yield a crystalline product containing primarily suberic, azelaic and sebacic acids together with smaller amounts of succinic and adipic acids, dissolving this crystalline product in a non-polar to slightly polar solvent and crystallizing out succinic and adipic acids at a higher temperature and then at a lower temperature separating suberic, azelaic and sebacic acids as a separate fraction while retaining some monocarboxylic acid in solution, dissolving said separate fraction in a relatively non-polar to slightly polar solvent, cooling the solution to separate a substantial amount of the suberic acid therefrom while retaining some suberic acid and a substantial amount of azelaic acid in solution, then on further cooling separating the azelaic acid without separating any substantial amount of suberic acid therefrom, and then crystallizing the separated azelaic acid from water.

3. In the process of producing azelaic acid from the oxidation of source material from the class consisting of saturated and unsaturated acyclic hydrocarobns and oxygen-containing derivatives thereof which hydrocarbons and derivatives comprise at least 9 carbon atoms in a straight saturated chain, with production of an aqueous reaction product which comprises adipic, pimelic, suberic and azelaic acids, with some of the adipic and most of the pimelic, suberic and azelaic acids from said oxidation in the aqueous reaction product, recovering from the aqueous product most of the suberic and azelaic acids as a solid mass which contains little adipic acid, dissolving the mass in a non-polar to slightly polar solvent and crystallizing a substantial amount of the suberic acid therefrom while retaining some suberic acid and a substantial amount of azelaic acid in solution, then on further cooling separating the azelaic acid in a separate fraction without separating more than a minor amount of suberic acid then crystallizing the azelaic acid from a polar solvent.

4. In the process of producing azelaic acid from the oxidation of source material from the class consisting of saturated and unsaturated acyclic hydrocarbons and oxygen-containing derivatives thereof which hydrocarbons and derivatives comprise at least 9 carbon atoms in a straight saturated chain, with production of an aqueous reaction product which comprises adipic, pimelic, suberic and azelaic acids, with some of the adipic and most of the pimelic, suberic and azelaic acids in the aqueous reaction product, the steps of recovering from the aqueous product most of the suberic and azelaic acids as a solid mass which contains little adipic acid, dissolving the mass in a non-polar to slightly polar solvent and crystallizing a substantial amount of the suberic acid therefrom while retaining some suberic acid and a substantial amount of azelaic acid in solution, then on further cooling separating the azelaic acid in a separate fraction without separating more than a minor amount of suberic acid and then crystallizing the azelaic acid from water.

5. In the preparation of azelaic acid from the oxidation of source material of the class consisting of saturated and unsaturated acyclic hydrocarbons and oxygen-containing derivatives thereof which hydrocarbon and derivatives contain at least 9 carbon atoms in a straight saturated chain with production therefrom of a solid mass which is essentially suberic acid and higher dicarboxylic acid and contains a substantial amount of azelaic acid the steps which comprise dissolving the mass in a non-polar to slightly polar solvent, crystallizing out a substantial amount of the suberic acid while retaining some suberic acid and a substantial amount of azelaic acid in solution, then on further cooling separating the azelaic acid in a separate fraction without separating more than a minor amount of suberic acid and thereafter purifying the azelaic acid from water.

6. In the preparation of azelaic acid from the oxidation of naturally occurring fatty acid of at least 9 carbon atoms with production of a solid mass which is essentially suberic acid and higher dicarboxylic acid and contains a substantial amount of azelaic acid, the steps which comprise dissolving the mass in a non-polar to slightly polar solvent, crystallizing out a substantial amount of the suberic acid while retaining some suberic acid and a substantial amount of azelaic acid in solution, then on further cooling separating the azelaic acid in a separate fraction without separating more than a minor amount of suberic acid and thereafter purifying the azelaic acid from water.

7. In the preparation of azelaic acid from the oxidation of naturally occurring fatty acid of at least 9 carbon atoms with aqueous nitric acid with production of a solid mass which is essentially suberic acid and higher dicarboxylic acid and contains a substantial amount of azelaic acid, the steps which comprise dissolving the mass in a non-polar to slightly polar solvent, crystallizing out a substantial amount of the suberic acid while retaining some suberic acid and a substantial amount of azelaic acid in solution, then on further cooling separating the azelaic acid in a separate fraction without separating more than a minor amount of suberic acid and thereafter purifying the azelaic acid from water.

8. The method of producing azelaic acid from a crystalline mixture composed essentially of suberic acid and higher dicarboxylic acid, including azelaic acid, which comprises dissolving the same in a non-polar to slightly polar solvent, crystallizing therefrom a substantial amount of the suberic acid while retaining some suberic acid and a substantial amount of azelaic acid in solution, then on further cooling separating the azelaic acid in a separate fraction without separating more than a minor amount of suberic acid, and then purifying the azelaic acid by crystallization from water.

9. The method of producing azelaic acid of high purity from a crystalline mixture of alpha, omega-dicarboxylic acids composed largely of suberic and azelaic acids, which comprises dissolving the mixture in a non-polar to slightly polar solvent, cooling and separating a substantial amount of the suberic acid in crystalline form while retaining some suberic acid and a substantial amount of azelaic acid in solution, then on further cooling separating the azelaic acid in a separate fraction without separating more than a minor amount of suberic acid, and then dissolving this azelaic acid fraction in water and on cooling separating azelaic acid therefrom in a very pure state.

References Cited in the file of this patent

UNITED STATES PATENTS

| | | |
|---|---|---|
| 2,203,680 | Ellingboe | June 11, 1940 |
| 2,389,191 | Fitzpatrick et al. | Nov. 20, 1945 |
| 2,716,133 | Pooler | Aug. 23, 1955 |
| 2,749,364 | Greenbert | June 5, 1956 |
| 2,773,094 | Englert et al. | Dec. 4, 1956 |

U. S. DEPARTMENT OF COMMERCE

PATENT OFFICE

CERTIFICATE OF CORRECTION

Patent No. 2,824,134                                          February 18, 1958

Norman C. Hill et al.

It is hereby certified that error appears in the printed specification of the above numbered patent requiring correction and that the said Letters Patent should read as corrected below.

Column 6, line 46, for "part sof" read -- parts of --; column 7, line 21, for "weighted" read -- weighed --; column 9, line 67, after "product," insert -- the steps of --; column 10, line 1, for "acid then" read -- acid and then --.

Signed and sealed this 8th day of April 1958.

(SEAL)
Attest:
KARL H. AXLINE

Attesting Officer

ROBERT C. WATSON
Commissioner of Patents